United States Patent
Matsuda (10) Patent No.: US 10,864,798 B2
(45) Date of Patent: Dec. 15, 2020

(54) LINK MECHANISM

(71) Applicant: DENSO CORPORATION, Kariya (JP)

(72) Inventor: Toshikazu Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 76 days.

(21) Appl. No.: 16/312,312

(22) PCT Filed: Jun. 1, 2017

(86) PCT No.: PCT/JP2017/020392
§ 371 (c)(1),
(2) Date: Dec. 21, 2018

(87) PCT Pub. No.: WO2018/003392
PCT Pub. Date: Jan. 4, 2018

(65) Prior Publication Data
US 2019/0232756 A1     Aug. 1, 2019

(30) Foreign Application Priority Data
Jun. 29, 2016  (JP) ................. 2016-128569

(51) Int. Cl.
*B60H 1/00*     (2006.01)
*E05F 15/616*    (2015.01)

(52) U.S. Cl.
CPC ....... *B60H 1/00857* (2013.01); *E05F 15/616* (2015.01); *E05Y 2900/531* (2013.01)

(58) Field of Classification Search
CPC ............ B60H 1/00857; B60H 1/00842; B60H 1/00664; B60H 2001/00092

USPC .......... 454/74, 333, 155, 127, 121; 165/204
See application file for complete search history.

(56) References Cited

U.S. PATENT DOCUMENTS 7,431,639 B2 * 10/2008 Enomoto ........... B60H 1/00521
                                                        165/41

FOREIGN PATENT DOCUMENTS

| EP | 2875977 A1  | 5/2015  |
|----|-------------|---------|
| JP | S60-117210 U | 8/1985 |
| JP | S63199813 U | 12/1988 |
| JP | 2004058941 A | 2/2004 |
| JP | 2007147033 A | 6/2007 |
| JP | 2007161085 A | 6/2007 |
| JP | 2008018886 A | 1/2008 |
| JP | 2008037378 A | 2/2008 |
| JP | 2008110721 A | 5/2008 |
| JP | 2013071484 A | 4/2013 |
| JP | 2015093583 A | 5/2015 |

* cited by examiner

*Primary Examiner* — Vivek K Shirsat
(74) *Attorney, Agent, or Firm* — Harness, Dickey & Pierce, P.L.C.

(57) ABSTRACT

A link mechanism includes a first link member, a second link member, a third link member, and a link cover. The first link member is connected to a motor and rotated by the motor. The second link member is connected to an open/close door which opens and closes a blowout opening through which air is blown to adjust the temperature inside the passenger compartment. The third link member has a rotation shaft supported by a fixing member, and connects the first link member and the second link member with each other. The link cover is arranged to cover the periphery of the first link member. The link cover has a protrusion protruding toward the third link member.

6 Claims, 8 Drawing Sheets

LINK MECHANISM

CROSS REFERENCE TO RELATED APPLICATIONS

This application is a U.S. National Phase Application under 35 U.S.C. 371 of International Application No. PCT/JP2017/020392 filed on Jun. 1, 2017. This application is based on and claims the benefits of priority from Japanese Patent Application No. 2016-128569 filed on Jun. 29, 2016. The entire disclosures of all of the above applications are incorporated herein by reference.

TECHNICAL FIELD

The present disclosure relates to a link mechanism for opening and closing an opening and closing door provided in a blowout opening through which air is blown out for air-conditioning in a vehicle interior.

BACKGROUND ART

An air conditioner for a vehicle includes: plural air outlets for blowing out air to adjust the temperature inside the vehicle cabin from an air passage in an air conditioning case; plural open/close doors for opening and closing the air outlets; a link mechanism connected to the plural open/close doors; and a motor for opening and closing the open/close door via the link mechanism. Conventionally, this kind of link mechanism is described in Patent Document 1.

The link mechanism described in Patent Document 1 includes a mode link, a first link member, and a second link member. The mode link is formed in a disk shape. A guide groove is formed in the mode link. One end of the first link member has a pin to be inserted into the guide groove of the mode link. The other end portion of the first link member is connected to the rotation shaft of the open/close door via the second link member. The first link member has a rotation shaft rotatably supported with respect to the air conditioning case.

In the link mechanism described in Patent Document 1, when the mode link is rotated by the motor, the pin of the first link member is displaced along the guide groove of the mode link. When the first link member rotates around the rotation shaft based on the displacement of the pin, the second link member is displaced to open or close the defroster door.

PRIOR ART LITERATURES

Patent Literature

Patent Document 1: JP 2004-58941 A

SUMMARY OF INVENTION

In the link mechanism as described in Patent Document 1, the rotation shaft of the first link member is not fixed to the air-conditioning case, and is inserted into an insertion hole of the air-conditioning case so as to be prevented from falling out. Therefore, the orientation of the first link member may be affected by an external force applied from the open/close door to the first link member via the second link member.

Specifically, when the open/close door is held in a state of being opened with a predetermined opening degree, the open/close door receives the wind pressure from the flow of the air-conditioning air blown out from the air outlet. That is, the open/close door receives the wind pressure in a direction from the inside of the air conditioning case to the inside of the passenger compartment. In other words, the open/close door receives the wind pressure in the direction to bring the open/close door to the fully closed state. When an external force acts on the open/close door based on the wind pressure, the external force acts on the first link member via the second link member. When the orientation of the first link member is affected by the external force, the second link member is displaced from an appropriate position. As a result, the position of the open/close door is deviated in the direction to the fully closed position from the position with the predetermined opening. In this case, not only the air volume cannot be secured but also a wind noise may be caused because the opening degree of the open/close door becomes minute.

An object of the present disclosure is to provide a link mechanism capable of improving the positioning accuracy of an open/close door.

According to an aspect of the present disclosure, a link mechanism includes: a first link member that is to be connected to a motor, the first link member being rotated by the motor; a second link member that is to be connected to an open/close door to open and close an air outlet for blowing out air to adjust a temperature inside a passenger compartment; and a third link member having a rotation shaft that is to be supported by a fixing member, the third link member connecting the first link member and the second link member with each other. The first link member has a protrusion protruding toward the third link member.

According to another aspect of the present disclosure, a link mechanism includes a first link member, a second link member, a third link member, and a link cover. The first link member is to be connected to a motor, and the first link member is rotated by the motor. The second link member is to be connected to an open/close door to open and close an air outlet for blowing out air to adjust a temperature inside a passenger compartment. The third link member has a rotation shaft that is to be supported by a fixing member, and the third link member connects the first link member and the second link member with each other. The link cover is disposed to cover the periphery of the first link member, and the link cover has a protrusion protruding toward the third link member.

Accordingly, even when the orientation of the third link member is affected by an external force that is a wind pressure applied to the open/close door, the third link member contacts the protrusion of the first link member or the protrusion of the link cover, so that the inclination of the third link member can be suppressed. As a result, since the positional deviation of the second link member can be suppressed, the positioning accuracy of the open/close door can be improved.

DESCRIPTION OF EMBODIMENTS

A link mechanism according to an embodiment will be described below. First, an overview of an air conditioner for a vehicle will be described, in which a link mechanism of the present embodiment is used.

Figure 1:
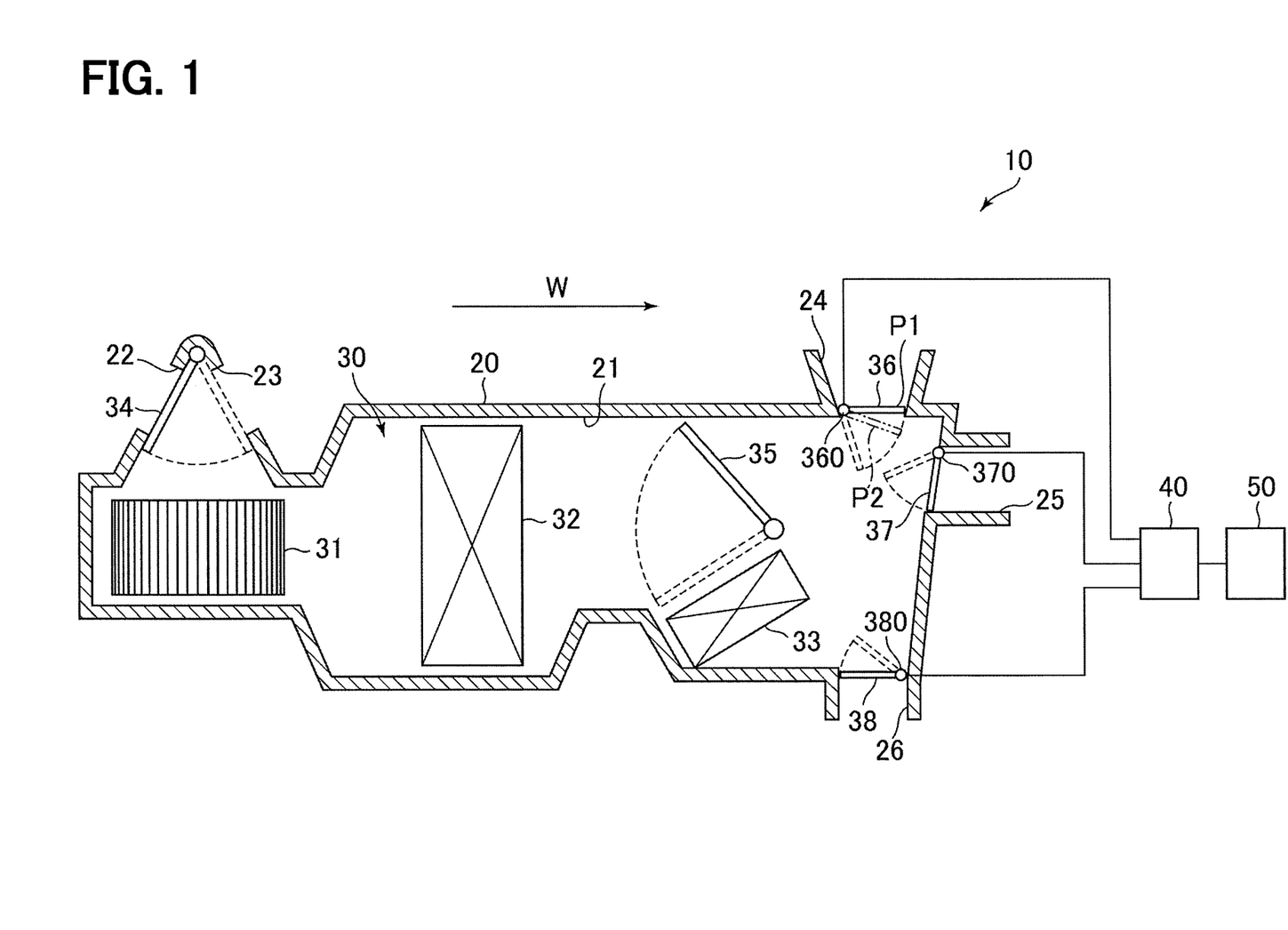
FIG. 1 is a schematic view illustrating a configuration of an air conditioner for a vehicle.

As shown in FIG. 1, an air conditioner 10 for a vehicle includes an air conditioning case 20 and an air conditioning unit 30. The air conditioner 10 is provided inside the instrument panel of the vehicle.

An air passage 21 is formed inside the air conditioning case 20. The air passage 21 is a passage for guiding air for air-conditioning in the passenger compartment. The air for air-conditioning is used for adjusting the temperature inside the passenger compartment. In the air passage 21, air flows in the direction indicated by the arrow W in the drawing.

At a portion of the air conditioning case 20 on the upstream side in the air flow direction W, an outside air suction port 22 and an inside air suction port 23 are formed for taking air into the air passage 21 from the outside of the air conditioning case 20. The outside air suction port 22 takes outside air that is air outside the vehicle compartment into the air passage 21. The inside air suction port 23 takes inside air that is air inside the vehicle interior into the air passage 21.

A defroster air outlet 24, a face air outlet 25, and a foot air outlet 26 are formed in a portion of the air conditioning case 20 on the downstream side in the air flow direction W. The defroster air outlet 24 blows the air flowing in the air conditioning case 20 toward the inner surface of the windshield of the vehicle. The face air outlet 25 blows the air flowing in the air conditioning case 20 toward the driver or passenger in the passenger seat. The foot air outlet 26 blows the air flowing in the air conditioning case 20 toward the feet of the driver or passenger in the passenger seat.

The air conditioning unit 30 generates air for air-conditioning based on the air introduced into the air passage 21 from the outside air suction port 22 or the inside air suction port 23. The air conditioning unit 30 includes a blower fan 31, an evaporator 32, and a heater core 33.

The blower fan 31 is disposed on the downstream side in the air flow direction W of the outside air suction port 22 and the inside air suction port 23. The blower fan 31 is rotated by electric power to generate an air flow in the air passage 21. The flow rate of the air flowing in the air passage 21, in other words, the volume of the air for air-conditioning is adjusted by adjusting the amount of electricity supplied to the blower fan 31.

The evaporator 32 is disposed on the downstream side in the air flow direction W of the blower fan 31. The evaporator 32 is an element of a refrigeration cycle (not shown). In addition to the evaporator 32, the refrigeration cycle includes a compressor, a condenser, and an expansion valve. In the refrigeration cycle, refrigerant is circulated in the order of the compressor, the condenser, the expansion valve, and the evaporator 32. In the evaporator 32, heat exchange is performed between the refrigerant flowing inside and the air in the air passage 21, whereby the refrigerant evaporates and vaporizes. The evaporator 32 has a function of cooling air in the air passage 21 and a function of dehumidifying air in the air passage 21 by utilizing heat of vaporization when the refrigerant is vaporized.

The heater core 33 is disposed on the downstream side in the air flow direction W of the evaporator 32. The heater core 33 is connected to an engine (not shown) via piping. Engine cooling water circulates between the engine and the heater core 33 via the piping. The heater core 33 heats air in the air passage 21 using the engine cooling water flowing inside as a heat source.

The air conditioning unit 30 further includes an inside/outside air switching door 34, an air mixing door 35, a defroster door 36, a face door 37, a foot door 38, a link mechanism 40, and a motor 50.

The inside/outside air switching door 34 opens and closes the outside air suction port 22 and the inside air suction port 23. When the inside/outside air switching door 34 is positioned at the inside air introduction position indicated by the solid line in the drawing, the outside air suction port 22 is closed and the inside air suction port 23 is opened. In this case, the air conditioner 10 enters an inside air circulation mode in which the inside air is taken into the air passage 21 from the inside air suction port 23. On the other hand, when the inside/outside air switching door 34 is located at the outside air introduction position indicated by the broken line in the figure, the inside air suction port 23 is closed and the outside air suction port 22 is opened. In this case, the air conditioner 10 enters the outside air introduction mode in which outside air is taken into the air passage 21 from the outside air suction port 22.

The air mixing door 35 adjusts the ratio between the volume of the air flowing into the heater core 33 and the volume of the air bypassing the heater core 33. Specifically, the position of the air mixing door 35 can be adjusted between the maximum heating position indicated by the solid line in the figure and the maximum cooling position indicated by the broken line in the figure. When the position of the air mixing door 35 is the maximum heating position, most of the air having passed through the evaporator 32 passes through the heater core 33, so that the temperature of the air rises most. When the position of the air mixing door 35 is the maximum cooling position, most of the air having passed through the evaporator 32 bypasses the heater core 33. In this case, since the air cooled by the evaporator 32 directly flows to the respective outlets 24 to 26, the temperature of the air decreases the most. In the air conditioner 10, the opening degree of the air mixing door 35 is adjusted between the maximum heating position and the maximum cooling position, whereby the temperature of the air is adjusted.

The defroster door 36 rotates about a rotation shaft 360 to open and close the defroster air outlet 24. The face door 37 rotates about a rotation shaft 370 to open and close the face air outlet 25. The foot door 38 rotates about a rotation shaft 380 to open and close the foot air outlet 26. Therefore, in the air conditioner 10, the air conditioned in the air conditioning case 20 is blown toward the interior of the vehicle from the air outlets which are opened, of the air outlets 24 to 26.

The link mechanism 40 is connected to the rotation shaft 360 of the defroster door 36, the rotation shaft 370 of the face door 37, and the rotation shaft 380 of the foot door 38. The motor 50 rotates the rotation shaft 360, 370, 380 via the link mechanism 40 to open and close the doors 36 to 38. The motor 50 is a servomotor.

Next, the structure of the link mechanism 40 will be described in detail. For the sake of convenience, only the structure for opening and closing the defroster door 36 will be described below, and the structure for opening and closing the face door 37 and the foot door 38 will be omitted. In the present embodiment, the defroster door 36 corresponds to an open/close door.

Figure 2:
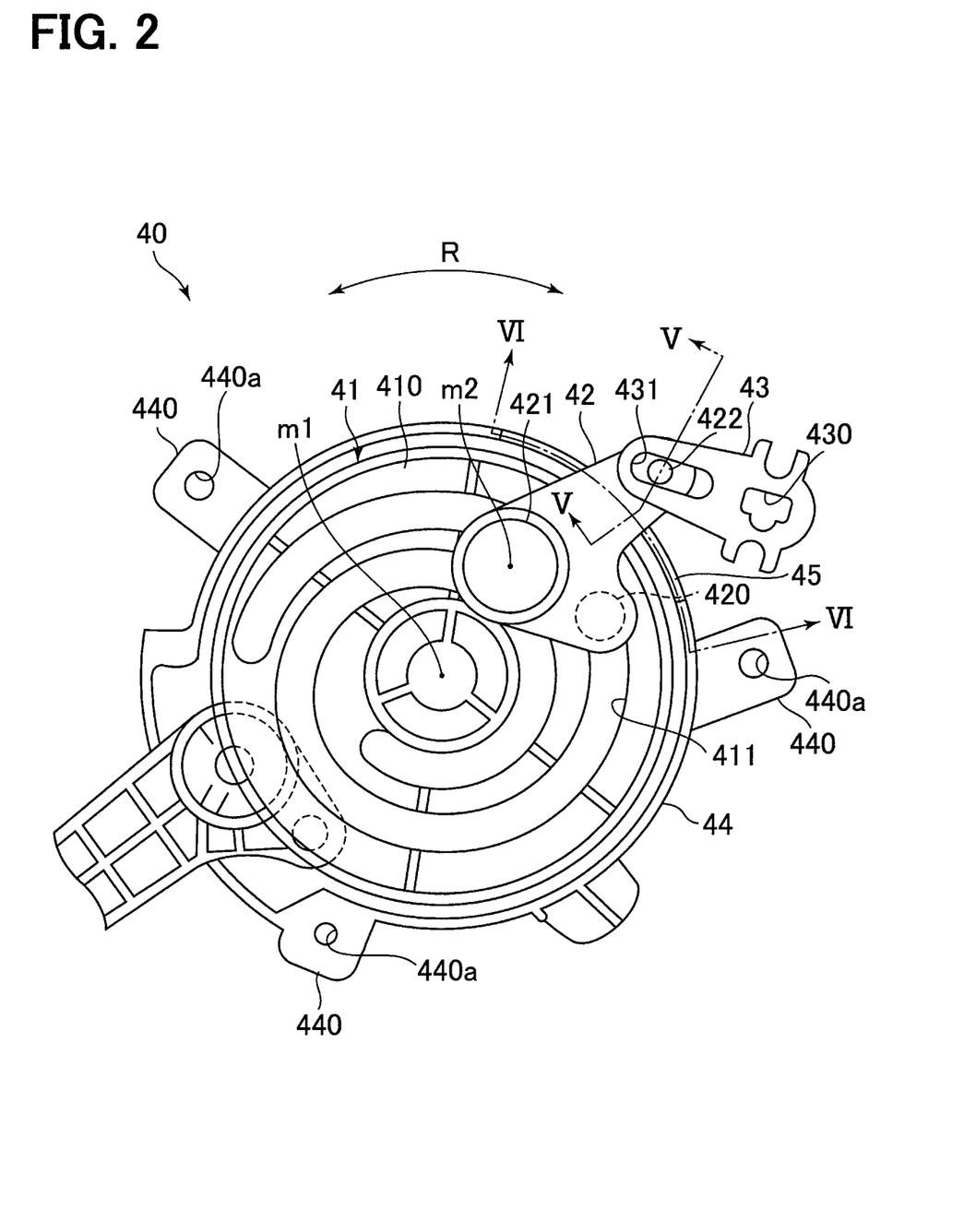
FIG. 2 is a front view illustrating a front structure of a link mechanism according to an embodiment.
Figure 3:
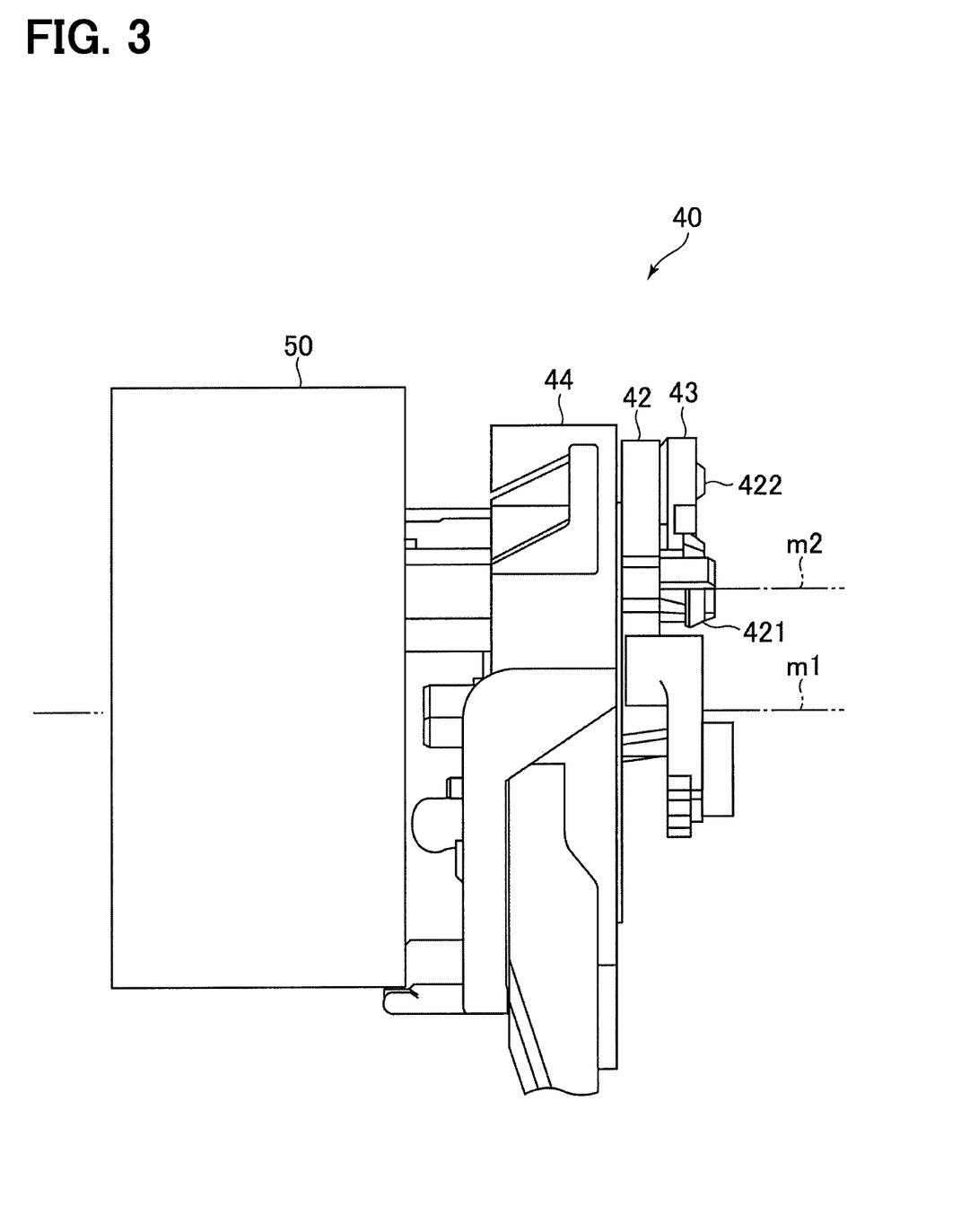
FIG. 3 is a side view illustrating a side structure of the link mechanism according to the embodiment.

As shown in FIGS. 2 and 3, the link mechanism 40 includes a disk link member 41, an intermediate link member 42, a door link member 43, and a link cover 44.

The disk link member 41 has a disk shape around the axis m1 in the drawing. A rotation shaft of the motor 50 shown in FIG. 3 is connected to the center portion of the disk link member 41. The disk link member 41 is rotated by the motor 50 in the direction indicated by the arrow R about the central axis m1 shown in FIG. 2. As shown in FIG. 2, a guide groove 411 is formed on one side surface 410 of the disk link member 41 in the axial direction. The guide groove 411 is formed to extend in a curved shape in the circumferential direction of the disk link member 41. In the present embodiment, the disk link member 41 corresponds to a first link member.

A fitting hole 430 is formed in the distal end portion of the door link member 43. The rotation shaft 360 of the defroster door 36 shown in FIG. 1 is fitted into the fitting hole 430. The door link member 43 is connected to the defroster door 36 by the fitting structure, so that the door link member 43 rotates integrally with the defroster door 36. As shown in FIG. 2, an elongated insertion hole 431 is formed in the base end portion of the door link member 43. In the present embodiment, the door link member 43 corresponds to a second link member.

Figure 4:
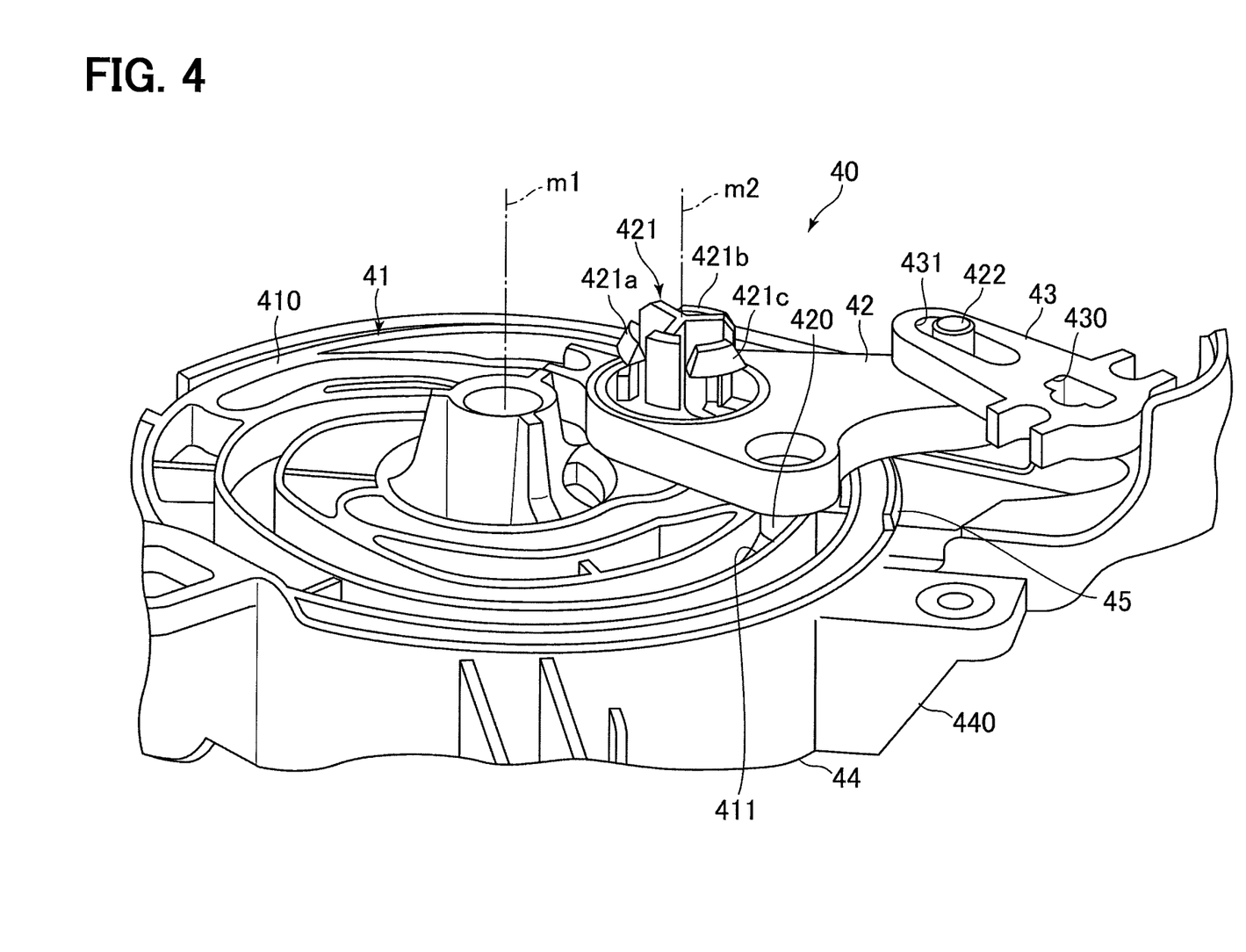
FIG. 4 is a perspective view illustrating a perspective structure of the link mechanism according to the embodiment.

A pin 420 and a rotation shaft 421 are formed at one end portion of the intermediate link member 42. As shown in FIG. 4, the pin 420 extends parallel to the axis m1 toward the disk link member 41, and is slidably inserted in the guide groove 411 of the disk link member 41. The rotation shaft 421 has three claw portions 421a to 421c. The claw portions 421a to 421c are attached to the air conditioning case 20 by being inserted into an insertion hole (not shown) formed in the air conditioning case 20. Due to the attachment structure of the claw portions 421a to 421c, the intermediate link member 42 is supported by the air conditioning case 20 so as to be rotatable around an axis m2 passing through the center of the rotation shaft 421. In the present embodiment, the air conditioning case 20 corresponds to a fixing member.

Figure 5:
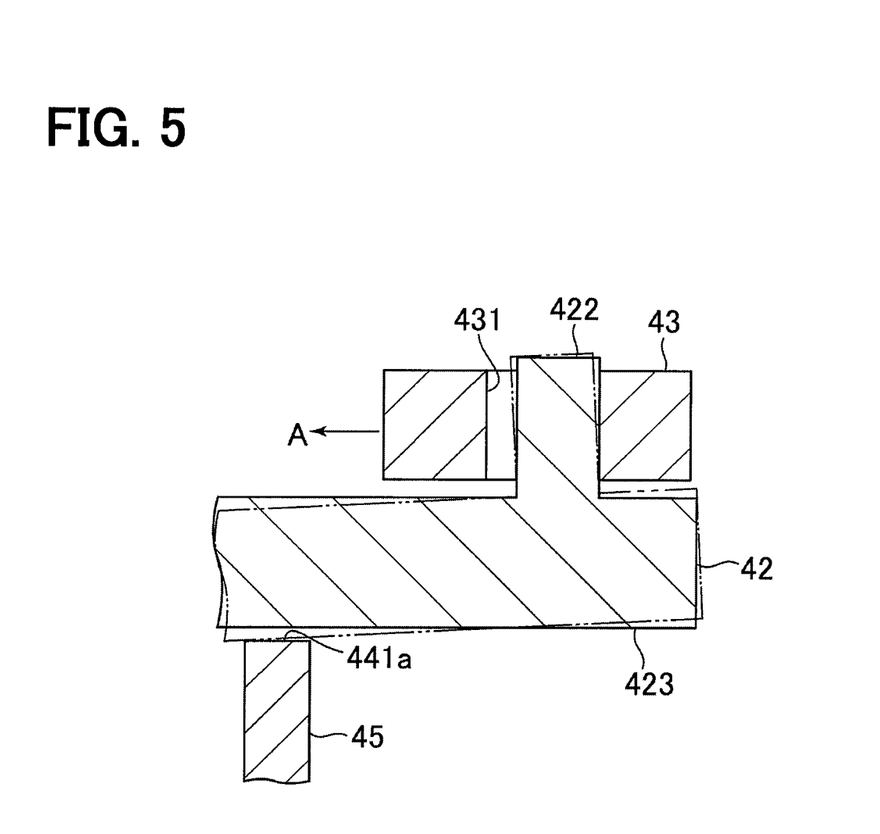
FIG. 5 is a cross-sectional view taken along a line V-V of FIG. 2.

A pin 422 is formed at the other end portion of the intermediate link member 42. The pin 422 is inserted into the insertion hole 431 of the door link member 43. FIG. 5 is a cross-sectional view taken along a line IV-IV of FIG. 2. Specifically, as shown in FIG. 5, the pin 422 is inserted in the insertion hole 431 of the door link member 43 with a predetermined clearance. In the present embodiment, the intermediate link member 42 corresponds to a third link member.

As shown in FIGS. 2 and 4, the link cover 44 is arranged so as to cover the periphery of the disk link member 41. Plural protrusions 440 are formed on the outer peripheral surface of the link cover 44. An insertion hole 440a is formed in each of the protrusions 440, and penetrates in a direction parallel to the axis m1. The link cover 44 is fastened to the air conditioning case 20 by bolts inserted in the insertion holes 440a, whereby the link cover 44 is fixed to the air conditioning case 20.

As shown in FIG. 4, a portion of the link cover 44 opposing the intermediate link member 42 has a protrusion 45 protruding toward the intermediate link member 42. As shown in FIG. 5, the opposing surface 441a of the protrusion 45 opposing the intermediate link member 42 is formed parallel with the opposing surface 423 of the intermediate link member 42 opposing the disk link member 41.

Figure 6:
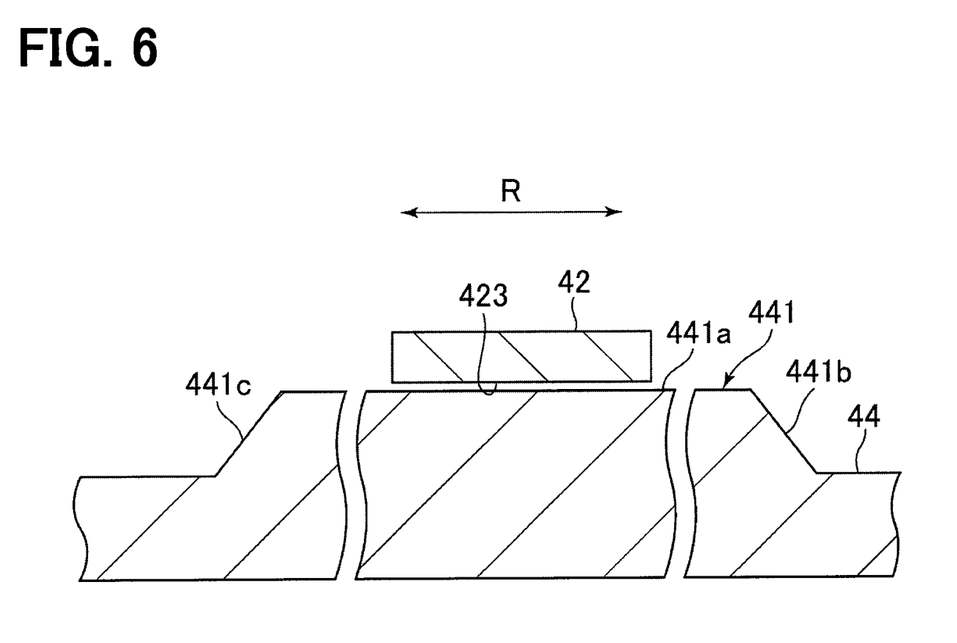
FIG. 6 is a cross-sectional view taken along a line VI-VI of FIG. 2.

FIG. 6 is a cross-sectional view taken along a line VI-VI of FIG. 2. As shown in FIG. 6, the side wall 441b, 441c of the protrusion 45 in the rotational direction R of the disk link member 41 has a tapered shape.

Next, an operation example of the link mechanism 40 of the present embodiment will be described.

When the disk link member 41 is rotated by the motor 50 around the axis m1, the pin 420 of the intermediate link member 42 is displaced along the guide groove 411 of the disk link member 41. Due to the displacement of the pin 420, the intermediate link member 42 rotates about the rotation shaft 421, whereby the door link member 43 is displaced. At this time, the door link member 43 and the rotation shaft 360 of the defroster door 36 integrally rotate, whereby the defroster door 36 opens and closes.

For example, when a heat mode is selected as the operation mode of the air conditioner 10, as shown in FIG. 1, the defroster door 36 is held at the position P2 where the defroster door 36 is opened by the predetermined opening degree from the fully closed position P1. The predetermined opening position P2 is set, for example, at a position to have an angle 5° from the fully closed position P1. In this case, a wind pressure acts on the defroster door 36 due to the flow of air passing through the defroster air outlet 24 from the air passage 21, whereby an external force is applied to the defroster door 36 in the direction toward the fully closed position P1. This external force will displace the door link member 43 in the direction indicated by the arrow A shown in FIG. 2, so that an external force in the direction A is applied to the end portion of the intermediate link member 42 adjacent to the pin 422.

Meanwhile, since the disk link member 41 is connected to the rotation shaft of the motor 50, the position of the disk link member 41 is fixed. Since the pin 420 of the intermediate link member 42 is inserted into the guide groove 411 of the disk link member 41, the position of the end portion of the intermediate link member 42 adjacent to the pin 420 is fixed.

Figure 7:
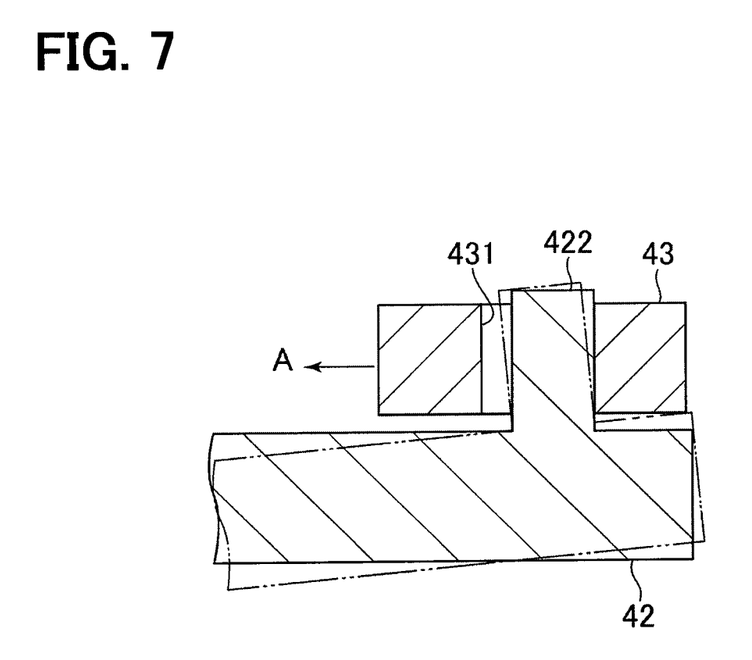
FIG. 7 is a cross-sectional view illustrating a cross-sectional structure of a link mechanism of a comparative example.

Thus, as shown in FIG. 7, when an external force is applied to the end portion of the intermediate link member 42 adjacent to the pin 422 in the direction A, as shown by a double chain line in FIG. 7, the intermediate link member 42 is inclined in such a manner that the end portion adjacent to the pin 422 is lifted up toward the door link member 43. Since the door link member 43 is displaced by the inclination of the intermediate link member 42, the position of the defroster door 36 may be shifted from the regular position P2.

In this respect, according to the link mechanism 40 of the present embodiment, as shown in FIG. 5, when the intermediate link member 42 is inclined, the intermediate link member 42 comes into contact with the protrusion 45 of the link cover 44. Therefore, the inclination of the intermediate link member 42 can be suppressed as shown by the double chain line in FIG. 5, according to the link mechanism 40 of the present embodiment, compared with a structure in which the protrusion 45 is not formed on the link cover 44, as shown by the double chain line in FIG. 7, in which the intermediate link member 42 is greatly inclined.

According to the link mechanism 40 of the present embodiment described above, the functions and effects shown in the following (1) to (3) can be obtained.

(1) Since the inclination of the intermediate link member 42 is suppressed, it is possible to suppress the positional deviation of the door link member 43. Accordingly, it is easy to position the defroster door 36 at the position P2 with the predetermined opening degree. That is, the positioning accuracy of the defroster door 36 can be improved.

(2) The side wall 441b, 441c of the protrusion 45 in the rotational direction R of the disk link member 41 is formed in the tapered shape. As a result, in case where the intermediate link member 42 moves relative to the disk link member 41 in the rotational direction R, even if the intermediate link member 42 contacts the side wall 441b, 441c of the protrusion 45, the impact force generated to the intermediate link member 42 can be reduced. Therefore, it is possible to suppress abnormal noise generated by the contact and breakage of the intermediate link member 42.

(3) The opposing surface 441a of the protrusion 45 that faces the intermediate link member 42 is formed in parallel with the opposing surface 423 of the intermediate link member 42 that faces the disk link member 41. Accordingly, when the intermediate link member 42 comes into contact with the protrusion 45, the inclination of the intermediate link member 42 can be suppressed more accurately, so that the positioning accuracy of the defroster door 36 can be further improved.

It should be noted that the above embodiment may be modified as follows.

The shape of the protrusion 45 can be appropriately changed. For example, the tip portion of the protrusion 45 may be formed in a curved shape.

The protrusion 45 may be formed at least in a portion of the link cover 44 opposing the intermediate link member 42 when the defroster door 36 is held at the position P2 with the predetermined opening degree. Thus, it is possible to improve the positioning accuracy when the defroster door 36 is held at the position P2.

Figure 8:
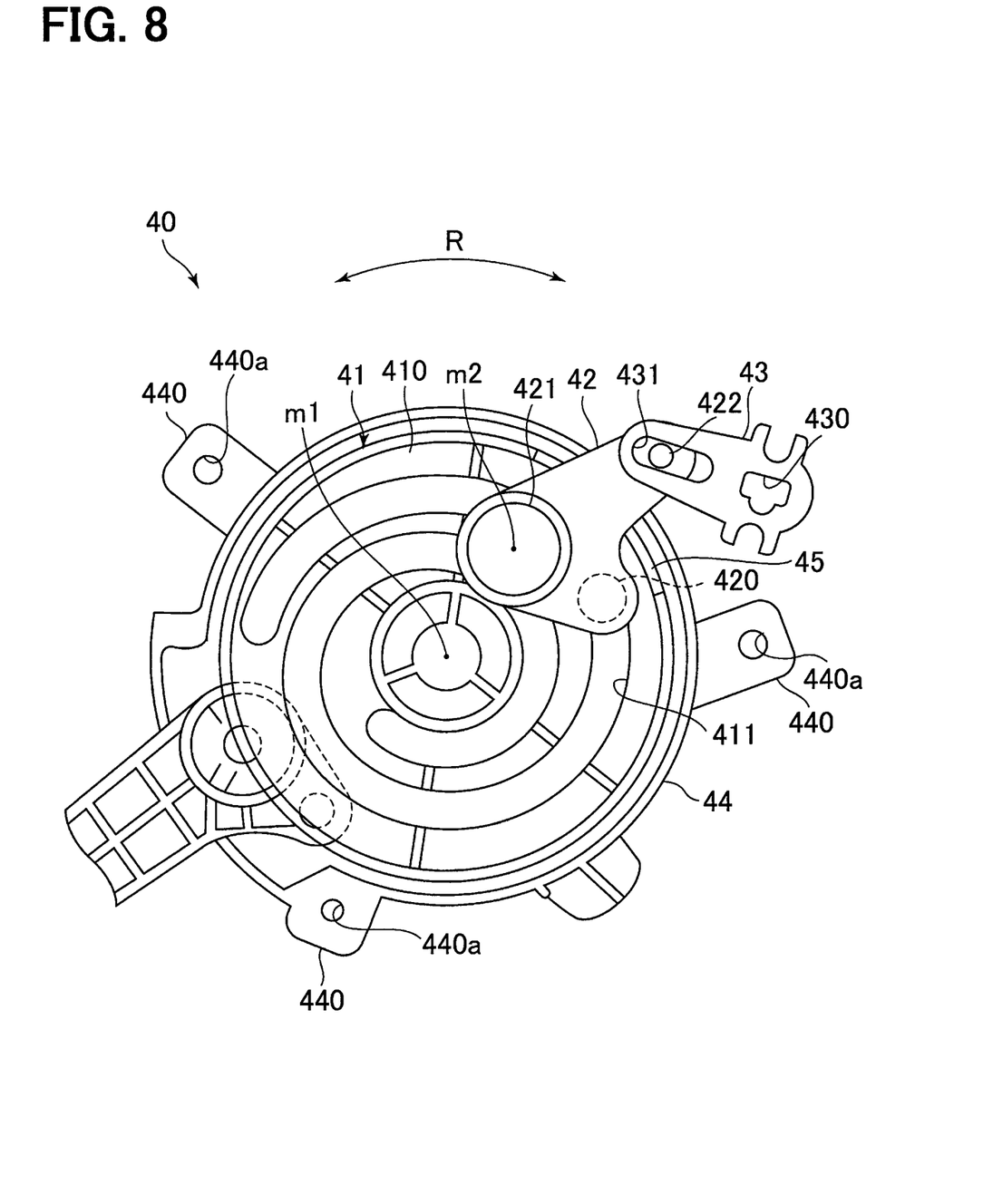
FIG. 8 is a front view illustrating a front structure of a link mechanism according to another embodiment.

As shown in FIG. 8, the protrusion 45 is not limited to be formed on the link cover 44, and may be formed on an outer edge portion of the side surface 410 of the disk link member 41. In this case, the protrusion 45 may be formed at least in a portion of the disc link member 41 opposing the intermediate link member 42 when the defroster door 36 is held at the position P2 with the predetermined opening degree. Thus, it is possible to improve the positioning accuracy when the defroster door 36 is held at the position P2.

The intermediate link member 42 is not limited to be fixed to the air conditioning case 20 and may be supported by an arbitrary fixing member.

The respective shape of the disk link member 41, the intermediate link member 42, and the door link member 43 can be appropriately changed.

The structure of the protrusion 45 of the above embodiment may be used as a structure for suppressing the inclination of the intermediate link member used for opening and closing the face door or the foot door.

The present disclosure is not limited to the specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

The invention claimed is:

1. A link mechanism comprising:
a first link member that is to be connected to a motor, the first link member being rotated by the motor;
a second link member that is to be connected to an open/close door to open and close an air outlet for blowing out air to adjust a temperature inside a passenger compartment;
a third link member having a rotation shaft that is to be supported by a fixing member, the third link member connecting the first link member and the second link member with each other; and
a link cover disposed to cover a periphery of the first link member, wherein the link cover has a protrusion protruding toward the third link member,
a side wall of the protrusion in a rotational direction of the first link member has a tapered shape, and
the protrusion overlaps with the third link member in a thickness direction of the third link member.

2. The link mechanism according to claim 1, wherein
the open/close door is held at a position where the open/close door is opened with a predetermined opening degree from a fully closed position, and
the protrusion is defined in a portion of the link cover facing the third link member when the open/close door is held with the predetermined opening degree.

3. The link mechanism according to claim 1, wherein
an opposing surface of the protrusion that faces the third link member is parallel to an opposing surface of the third link member that faces the first link member.

4. The link mechanism according to claim 1, wherein
the protrusion extends in the rotational direction of the first link member.

5. The link mechanism according to claim 4, wherein
the protrusion has an opposing surface facing the third link member, and both side walls of the protrusion in the rotational direction are formed in the tapered shape.

6. The link mechanism according to claim 1, wherein
both side walls of the protrusion in the rotational direction of the first link member are formed in the tapered shape.

* * * * *